(12) United States Patent
Yun et al.

(10) Patent No.: US 10,030,162 B2
(45) Date of Patent: *Jul. 24, 2018

(54) PROCESS FOR PREPARING TRANSPARENT/SEMI-TRANSPARENT COLOR DISPERSIONS AND THE COLOR DISPERSIONS MADE THEREOF

(71) Applicants: Dow Global Technologies LLC, Midland, MI (US); Rohm and Haas Company, Philadelphia, PA (US)

(72) Inventors: Dong Yun, Shanghai (CN); Yujiang Wang, Shanghai (CN); Hui Liu, Shanghai (CN); Caifeng Wang, Shanghai (CN); Siyuan Jiang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/477,298

(22) Filed: Sep. 4, 2014

(65) Prior Publication Data

US 2015/0065618 A1   Mar. 5, 2015

(30) Foreign Application Priority Data

Sep. 4, 2013   (CN) .......................... 2013 1 0398395

(51) Int. Cl.
*C09D 101/28*   (2006.01)
*C09B 67/46*   (2006.01)
(Continued)

(52) U.S. Cl.
CPC ...... *C09D 101/284* (2013.01); *C09B 67/0033* (2013.01); *C09B 67/0085* (2013.01);
(Continued)

(58) Field of Classification Search
CPC .......................... C09D 133/00; C09D 101/28; C09D 101/284; C09D 5/14; C09D 5/29;
(Continued)

(56) References Cited

U.S. PATENT DOCUMENTS 2,591,904 A   4/1952   Zola
3,058,931 A   10/1962   Petty
(Continued)

FOREIGN PATENT DOCUMENTS

CA   1193372 A   9/1985
CN   1097782 A   1/1995
(Continued)

OTHER PUBLICATIONS

Thielking, H., et al., "Cellulose Ethers," Ullmann's Encyclopedia of Industrial Chemistry, published online 2006, vol. 7, 381-397.*
(Continued)

*Primary Examiner* — Nicholas E Hill
(74) *Attorney, Agent, or Firm* — Karl E. Stauss; Cantor Colburn LLP

(57) ABSTRACT

This invention relates to a process for preparing color dispersions comprising a first step of contacting water, a first colorant, and a polysaccharide selected from methylcellulose, hydropropylmethylcellulose, hydroxyethylmethylcellulose, hydroxybutylmethylcellulose, hydroxyethylethylcellulose, and the mixture thereof, to form a first colorant dispersion; a second step of contacting the first colorant dispersion with a protective composition comprising an aqueous dispersion of polymer particles, clay, and a peptizing agent to form a dispersion of protected first colorant particles; an optional third step of repeating the first step and the second step with a second colorant that is different from the first colorant to form a dispersion of protected second colorant particles; and an optional fourth step of mixing the
(Continued)

a    b dispersions of protected first and second colorant particles to form a multi-color dispersion. This invention also relates to a color dispersion comprising the first colorant dispersion, and a color coating comprising the color dispersion.

6 Claims, 1 Drawing Sheet
(1 of 1 Drawing Sheet(s) Filed in Color)

(51) Int. Cl.
*C09B 67/22* (2006.01)
*C09D 5/29* (2006.01)
*C09D 5/02* (2006.01)
*C09D 133/08* (2006.01)

(52) U.S. Cl.
CPC ............... *C09D 5/02* (2013.01); *C09D 5/29* (2013.01); *C09D 101/28* (2013.01); *C09D 133/08* (2013.01)

(58) Field of Classification Search
CPC . C08L 33/00; C08L 1/28; C08L 1/284; C09B 67/0033
See application file for complete search history.

(56) References Cited

U.S. PATENT DOCUMENTS

| | | |
|---|---|---|
| 3,458,328 A | 7/1969 | Zola |
| 3,725,089 A | 4/1973 | Zola |
| 3,950,283 A | 4/1976 | Sellars et al. |
| 4,127,687 A | 11/1978 | Dupont |
| 4,264,322 A | 4/1981 | Lewis et al. |
| 4,898,895 A | 2/1990 | Masuoka et al. |
| 5,114,481 A | 5/1992 | Lynch |
| 5,114,484 A | 5/1992 | Lynch |
| 5,114,485 A | 5/1992 | Lynch et al. |
| 5,199,801 A | 4/1993 | Grehn et al. |
| 5,199,980 A | 4/1993 | Lynch et al. |
| 5,314,535 A | 5/1994 | Lynch et al. |
| 5,318,619 A | 6/1994 | Lynch et al. |
| 5,437,719 A | 8/1995 | Lynch et al. |
| 5,480,480 A | 1/1996 | Lynch et al. |
| 6,005,031 A | 12/1999 | Bremer-Masseus et al. |
| 2004/0225051 A1 | 11/2004 | Moy |
| 2008/0289538 A1 | 11/2008 | Friedrich et al. |
| 2015/0059616 A1* | 3/2015 | Yun ................. C09B 67/0033 106/162.9 |
| 2015/0065168 A1 | 3/2015 | Roskind et al. |
| 2015/0148457 A1* | 5/2015 | Yun ................. C09D 7/1216 524/18 |
| 2017/0226364 A1* | 8/2017 | Zhang ................. C09D 125/14 |
| 2017/0298237 A1* | 10/2017 | Li ................. C09D 7/002 |

FOREIGN PATENT DOCUMENTS

| | | |
|---|---|---|
| CN | 1117509 A | 2/1996 |
| CN | 1532240 A | 9/2004 |
| CN | 101397483 A | 4/2009 |
| CN | 101397433 | 1/2012 |
| EP | 0505664 A1 | 9/1992 |
| EP | 0624181 A1 | 11/1994 |
| EP | 780449 | 6/1997 |
| EP | 0896988 A1 | 2/1999 |
| EP | 0896989 A1 | 2/1999 |
| GB | 2078243 A | 1/1982 |
| JP | 57133170 A | 8/1982 |
| JP | 2004182789 A | 7/2004 |
| JP | 2006199726 A | 8/2006 |
| JP | 03840280 A | 11/2006 |
| JP | 2007231151 A | 9/2007 |
| JP | 2007238919 A | 9/2007 |
| JP | 2007262350 A | 10/2007 |
| JP | 2007296459 A | 11/2007 |
| JP | 2007321045 A | 12/2007 |
| JP | 2011052052 A | 3/2011 |
| KR | 541628 B | 1/2006 |
| KR | 854445 B | 8/2008 |
| RU | 2238287 C2 | 10/2004 |
| WO | 1995032862 | 12/1995 |
| WO | 0036029 A1 | 6/2000 |
| WO | 2004046261 A2 | 6/2004 |
| WO | 2013181800 A1 | 12/2013 |
| WO | WO 2013181800 A1 * | 12/2013 ........... C09D 7/1216 |

OTHER PUBLICATIONS

Chang et al.; "Effects of mixed hydrocolloids on water-based multicolor coatings"; J. of Beijing Univ. of Chem. Tech.; vol. 37; No. 4; (2010) 5 pages with English Abstract.

* cited by examiner

PROCESS FOR PREPARING TRANSPARENT/SEMI-TRANSPARENT COLOR DISPERSIONS AND THE COLOR DISPERSIONS MADE THEREOF

FIELD OF THE INVENTION

This invention relates to a process for preparing transparent/semi-transparent color dispersions, the color dispersions made thereof, and a coating composition comprising the same. In particular, the color dispersions are multi-color.

INTRODUCTION

Multi-color coatings are water-based spray-on seamless alternatives to traditional single color coatings. Traditional single color coatings contain one colorant. Multi-color coatings contain at least two colorants with different colors. After spraying, colorant particles are distributed on surfaces to simulate natural stone surfaces or other natural multi-color surfaces. The resultant ornamental and durable multi-color surfaces make the final coatings desirable for architectural renovation or new construction.

The core part of multi-color coatings is a binder system protecting and separating the colorant particles. The binder system plays a critical role in determining the cost and the performance of the final coatings. Without the proper binder systems, multi-color coatings would require stringent storage and processing conditions, or would look obviously unnatural. Without the proper binder systems, the colorants might also easily release from the binder in water conditions to destroy multi-color performance.

Transparent or semi-transparent coating appearance is a researching hot spot of recent years. This performance is hard to be achieved by regular binder system.

It is still desirable to find a simple process for preparing color coatings, particularly multi-color coatings, which are stable, with colorant properly protected, and have specially required transparent or semi-transparent appearances.

SUMMARY OF THE INVENTION

The present invention provides a process for making a color dispersion comprising a first step of contacting water, a first colorant, and a polysaccharide selected from methylcellulose, hydropropylmethylcellulose, hydroxyethylmethylcellulose, hydroxybutylmethylcellulose, hydroxyethylethylcellulose, and the mixture thereof, to form a first colorant dispersion; the first colorant dispersion comprises based on the total weight of the first colorant dispersion, from 0.05 wt. % to 10 wt. % of the first colorant, from 0.05 wt. % to 10 wt. % of the polysaccharide.

The second step of the process is to contact the first colorant dispersion with a protective composition comprising an aqueous dispersion of polymer particles, clay, and a peptizing agent to form a dispersion of protected first colorant particles; the protective composition comprises based on the total weight of the protective composition, from 10 wt. % to 70 wt. % of the polymer particles, from 0.05 wt. % to 10 wt. % of the clay, and from 0.05 wt. % to 2 wt. % of the peptizing agent; wherein the weight to weight ratio of the first colorant dispersion to the protective composition is from 1:30 to 5:1.

An optional third step of the process is to repeat the first step and the second step with a second colorant that is different from the first colorant to form a dispersion of protected second colorant particles.

An optional fourth step of the process is to mix the dispersions of protected first and second colorant particles to form a two-color dispersion.

The present invention further provides a color dispersion comprising the first colorant dispersion.

The present invention further provides a color coating comprising the color dispersion.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
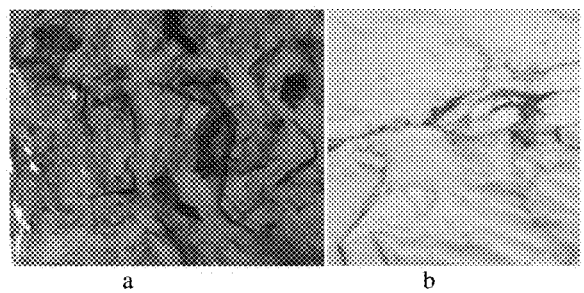
FIG. 1 shows the appearances of Inventive Example 8 (FIG. 1a) and a real marble surface (FIG. 1b).

For the purpose of describing the components, all phrases comprising parenthesis denote either or both of the included parenthetical matter and its absence. For example, the phrase "(co)polymer" includes, in the alternative, polymer, copolymer and the mixture thereof; the phrase "(meth)acrylate" means acrylate, methacrylate, and the mixture thereof.

As used herein, the term "wt. %" refers to weight percent.

The transparent/semi-transparent color dispersion of the present invention comprises a first colorant dispersion and a protective composition. The weight ratio of the first colorant dispersion to the protective composition is from 1:30 to 5:1, preferably from 1:25 to 4:1, and more preferably from 1:15 to 3:1.

First Colorant Dispersion

The first colorant dispersion of the present invention comprises based on the total weight of the first colorant dispersion, from 0.05 wt. % to 10 wt. %, preferably from 0.1 wt. % to 7 wt. %, and more preferably from 0.5 wt. % to 5 wt. %, of a first colorant.

The colorants are organic or inorganic colorant particles, preferably inorganic colorant particles. The illustrative examples of the colorant particles include titanium dioxide white, carbon black, lampblack, black iron oxide, red iron oxide, transparent red oxide, yellow iron oxide, transparent yellow oxide, brown iron oxide, phthalocyanine green, phthalocyanine blue, naphthol red, quinacridone red, quinacridone magenta, quinacridone violet, DNA orange, and organic yellow. The colorants can also be particulate inorganic material which is capable of materially contributing to the opacity or hiding capability of a coating.

The first colorant dispersion further comprises based on the total weight of the first colorant dispersion, from 0.05 wt. % to 10 wt. %, preferably from 0.1 wt. % to 8 wt. %, and more preferably from 0.5 wt. % to 5 wt. %, of a polysaccharide.

Suitable examples of the polysaccharide include methylcellulose (MC), hydropropylmethylcellulose (HPMC), hydroxyethylmethylcellulose (HEMC), hydroxybutylmethylcellulose (HBMC), hydroxyethylethylcellulose (HEEC), and the mixture thereof.

Optionally, the first colorant dispersion further comprises an aqueous dispersion of polymer particles. The polymer particles are present from 0.5 wt. % to 75 wt. %, preferably from 2 wt. % to 50 wt. %, and more preferably from 5 wt. % to 40 wt. % based on the total weight of the first colorant dispersion.

The first colorant dispersion may further comprise water so that the total weight percent of the first colorant dispersion reaches 100 wt. %.

Protective Composition

The protective composition of the present invention comprises an aqueous dispersion of polymer particles. The polymer particles are present from 10 wt. % to 70 wt. %, preferably from 20 wt. % to 50 wt. %, and more preferably from 30 wt. % to 0 wt. % based on the total weight of the protective composition.

The protective composition further comprises from 0.05 wt. % to 10 wt. %, preferably from 0.5 wt. % to 7.5 wt. %, and more preferably from 1 wt. % to 5 wt. % based on the total weight of the protective composition, of a clay.

The protective composition further comprises from 0.05 wt. % to 2 wt. %, preferably from 0.1 wt. % to 1.5 wt. %, and more preferably from 0.1 wt. % to 1 wt. % based on the total weight of the protective composition, of a peptizing agent.

The composition of the present invention may further comprise water so that the total weight of the composition reaches 100 wt. %.

The polymer particles used in the protective composition and optionally the first colorant dispersion of the present invention are preferably the polymerization product of at least one ethylenically unsaturated nonionic monomer. Herein, "nonionic monomer" means that the copolymerized monomer residue does not bear an ionic charge between pH=1-14. The ethylenically unsaturated nonionic monomers used in the present invention include (meth)acrylic ester monomers, where (meth)acrylic ester designates methacrylic ester or acrylic ester, including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, and hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate, vinyl versatate and other vinyl esters; and vinyl monomers such as vinyl chloride and vinylidene chloride.

The aqueous dispersion of polymer particles is typically formed by an addition polymerization emulsion polymerization process as is well known in the art. Conventional surfactants may be used, and include anionic and/or nonionic surfactants such as alkali metal or ammonium alkyl sulfates, alkyl sulfonic acids, fatty acids, oxyethylated alkyl phenols, and the mixture thereof. Polymerizable surfactants that include at least one ethylenically unsaturated carbon-carbon bond which can undergo free radical addition polymerization may also be used. The amount of surfactants used is usually from 0.1 wt. % to 6 wt. % based on the weight of total monomer. Either thermal or redox initiation processes may be used. Conventional free radical initiators may be used, such as hydrogen peroxide, t-butyl hydroperoxide, t-amyl hydroperoxide, ammonium and alkali persulfates, typically at a level of 0.01 wt. % to 3.0 wt. %, based on the weight of total monomer. The monomer mixture may be added in a single addition or more additions or continuously over the reaction period using a uniform or varying composition. Additional ingredients such as free radical initiators, oxidants, reducing agents, chain transfer agents, neutralizers, surfactants, and dispersants may be added prior to, during, or subsequent to the monomer addition.

Clays used in the protective composition are preferably hydrous phyllosilicates, with variable amounts of iron, magnesium, alkali metals, aluminum, alkaline earths, and other cations. Suitable examples of the clays include lithium magnesium silicate, such as LAPONITE™ RD clay and LAPONITE™ RDS clay commercially available from Rockwood Additives Ltd., and aluminum magnesium silicate, such as VEEGUM™ magnesium aluminum silicate commercially available from Vanderbilt Company, Inc.

The peptizing agents used in the protective composition are preferably sodium pyrophosphate, sodium carbonate, sodium polyphosphate, sodium metaphosphate, sodium polyacrylate, and sodium hydroxide. Sodium ion can be also replaced by other monovalent alkali metal ions, such as lithium and potassium.

The color dispersion of the present invention is prepared by contacting together water, the first colorant, and the polysaccharide selected from MC, HPMC, HEMC, HBMC, HEEC, and the mixture thereof, to make a first colorant dispersion.

In a preferred embodiment, the color dispersion of the present invention is prepared by contacting together water, the first colorant, the polysaccharide selected from MC, HPMC, HEMC, HBMC, HEEC, and the mixture thereof, and the aqueous dispersion of polymer particles, to make the first colorant dispersion.

The first colorant dispersion prepared is to contact with the protective composition comprising the aqueous dispersion of polymer particles, the clay, and the peptizing agent to prepare a dispersion of protected first colorant particles.

The color dispersion of the present invention can have just the first colorant and be used to prepare a single-color coating. More than one color dispersions of the present invention having different colorants can be used to prepare a multi-color coating.

A second colorant that has a different color from that of the first colorant can also be used in the above process, substituting the first colorant, to prepare a dispersion of protected second colorant particles.

According to the requirements of different multi-color coating applications, a dispersion of protected third, fourth, fifth, sixth, and so on, colorant particles can be prepared by following the above process.

The dispersions of protected first and second colorant particles are mixed together to obtain a two-color dispersion. Different kinds and numbers of dispersions of protected colorant particles could be mixed together to make multi-color dispersions of different needs.

Coating Composition and Application

The color dispersion is made into a coating composition by loading other coating additives. Illustrative examples of coating additives include coalescing agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, flowing agents, crosslinkers, and anti-oxidants.

Thickeners used in the present invention may include polyvinyl alcohol (PVA), hydrophobic ally modified alkali soluble emulsions (HASE), alkali-soluble or alkali swellable emulsions (ASE), hydrophobically modified ethylene oxide-urethane polymers (HEUR), cellulosic thickeners such as hydroxyl methylcellulose (HMC), hydroxyethylcellulose (HEC), hydrophobically-modified hydroxyethylcellulose (HMHEC), sodium carboxymethylcellulose (SCMC), Fumed silica, attapulgite clay and other types of clay, and titanate chelating agents can also be used as the thickeners of the present invention.

Dispersants used in the present invention may include non-ionic, anionic and cationic dispersants such as polyacid with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. Preferred dispersants are the polyacids with suitable molecular weight.

The polyacids used herein include homopolymers and copolymers based on polycarboxylic acids, including those that have been hydrophobically or hydrophilically modified, e.g., polyacrylic acid or polymethacrylic acid or maleic anhydride with various monomers such as styrene, acrylate or methacrylate esters, diisobutylene, and other hydrophilic or hydrophobic comonomers as well as the salts of the aforementioned dispersants, and the mixture thereof. The molecular weight of such polyacid dispersant is from 400 to 50,000, preferably from 400 to 30,000, more preferably from 500 to 10,000, even more preferably from 1,000 to 5,000, and most preferably from 1,500 to 3,000.

Antifoaming agents and/or defoaming agents used in the present invention may include silicone-based and mineral oil-based defoamers. Surfactants could be used herein include anionic, nonionic, cationic surfactants and amphiphilic surfactant. Preferably used surfactants are anionic and nonionic surfactants, and more preferably used are nonionic surfactants.

Biocides used in the present invention can be organic or inorganic biocides. Illustrative examples are described in U.S. Pat. No. 4,127,687 to DuPont, in U.S. Pat. No. 4,898,895 to Masuoka et al., and in WO1995032862A1. Preferably, the biocides have an active structure of diiodomethyl-p-tolylsulfone, 4,5-dichloro-2-octyl-2H-isothiazol-3-one (DCOIT), chloromethylisothiazolinone and methylisothiazolinone, and the mixture thereof.

The preparation of the coating composition involves a process of selecting and admixing appropriate coating ingredients in the correct proportions to provide coatings with specific processing and handling properties, as well as a final dry coating film with the desired properties.

The aqueous coating composition may be applied by conventional application methods including brushing, roller application, and spraying methods such as air-atomized spray, air-assisted spray, airless spray, high volume low pressure spray, and air-assisted airless spray.

Suitable substrates include concrete, cement board, medium-density fiber board (MDF) and particle board, gypsum board, wood, stone, metal, plastics, wall paper and textile. Preferably, all the substrates are pre-primed by waterborne or solvent-borne primers.

EXAMPLES

I. Raw Materials

| Ingredient | Supplier |
| --- | --- |
| guar gum (5500-6000 cps, 200 mesh) | Shree Ram Industries |
| gelatin gum (fine grade) | Sinopharm Chemical Reagent Co., Ltd. |
| METHOCEL ™ A 15 methylcellulose (A 15) | The Dow Chemical Company |
| METHOCEL ™ A 4C methylcellulose (A 4C) | The Dow Chemical Company |
| METHOCEL ™ A 4M methylcellulose (A 4M) | The Dow Chemical Company |
| METHOCEL ™ A 40M methylcellulose (A 40M) | The Dow Chemical Company |
| METHOCEL ™ F 4M hydroxypropylmethylcellulose (F 4M) | The Dow Chemical Company |
| METHOCEL ™ K 100M hydroxypropylmethylcellulose (K 100M) | The Dow Chemical Company |
| NATROSOL ™ 250 MHR hydroxylethylcellulose (250 MHR) | Ashland Aqualon Company |
| WALOCEL ™ CRT 3000 carboxylmethylcellulose (CRT 3000) | The Dow Chemical Company |
| LAPONITE ™ RD clay (RD) | Rockwood Additives Ltd. |
| XERACOLOUR ™ red oxide colorant | ICC International Chemical Corporation |
| XERACOLOUR ™ yellow oxide colorant | ICC International Chemical Corporation |
| XERACOLOUR ™ black colorant | ICC International Chemical Corporation |
| PRIMAL ™ AC 818 acrylic emulsion (AC 818) | Dow Chemical Company |
| PRIMAL ™ AC 261 acrylic emulsion (AC 261) | Dow Chemical Company |
| borax (chemical grade) | Sinopharm Chemical Reagent Co., Ltd. |
| sodium pyrophosphate (SPP) | Sinopharm Chemical Reagent Co., Ltd. |

II. Process and Method

Preparing Methods

Step a) Preparation of a First Colorant Dispersion

Powders of polysaccharide were dispersed into water by stirring at 200-1500 rpm for 5 min, and then incubated at 60-90° C. for 10 min with stirring at 500-2000 rpm. The system was cooled by ice water bath for 10 min, and was kept stirring at 500-2000 rpm. When the polysaccharide powders were dissolved, a first colorant, and optionally an aqueous dispersion of polymer particles were added into the solution with stirring at 2000 rpm for 20 min.

Step b) Preparation of a Dispersion of Protected First Colorant Particles

Clay and a peptizing agent were dissolved or dispersed in water with stirring at 200-2000 rpm for 30 min to make a clay dispersion. The clay dispersion was mixed with an aqueous dispersion of polymer particles, with stirring at 500-2000 rpm for 30 min. The prepared first colorant dispersion in Step a) was poured into the mixture of this step, and was kept stirring at 100-1500 rpm for 5~15 min.

Step c) Preparation of a Multi-Colorant Dispersion

According to different applications, two, three, or more colorants with different colors could be used in preparing the multi-color dispersions. The above steps were repeated with a second, third, or fourth colorant to make dispersions of protected second, third, or further colorant particles if necessary. Each kind of colorant was separately protected in the dispersion of protected colorant particles. The dispersions of protected first, second, third, or further colorant particles were mixed together, and were kept stirring at 50-2000 rpm for 30 min to make a multi-color dispersion.

Measurement

Colorant Protection

The dispersions of protected colorant particles were stirred and observed for color release by naked eyes. If colorants were protected, no release of colorant particles was observed, even after high stirring (>600 rpm). If colorants were not protected, colorant particles were released in the water during or after high stirring (>600 rpm).

III. Experimental Examples

Dispersions of protected first colorant particles (dispersions 1 to 12) were prepared according to the above process. Components of each dispersion were listed in Table 1.

TABLE 1

Components of the first colorant dispersions and the protective compositions

| | First colorant dispersion (wt. % based on the first colorant dispersion) | | Protective Composition (wt. % based on the protective composition) | | | |
|---|---|---|---|---|---|---|
| No. | Polysaccharide | Polymer Dispersion | Polymer Dispersion | Clay | Peptizing agent | Other Additives |
| 1 | A 15 1.5% | AC 818 10% | AC 818 40% | RD 5% | SPP 0.5% | — |
| 2 | A 4C 1.5% | AC 818 10% | AC 818 40% | RD 5% | SPP 0.5% | — |
| 3 | A 4M 1.5% | AC 818 10% | AC 818 40% | RD 5% | SPP 0.5% | — |
| 4 | A 40M 1.5% | AC 818 10% | AC 818 40% | RD 5% | SPP 0.5% | — |
| 5 | F 4M 1.5% | AC 818 10% | AC 818 40% | RD 5% | SPP 0.5% | — |
| 6 | A 40M 0.2% | AC 818 10% | AC 818 40% | RD 5% | SPP 0.5% | — |
| 7# | CRT 3000 1.5% | AC 818 10% | AC 818 40% | RD 5% | SPP 0.5% | — |
| 8 | A 40M 2% | AC 261 10% | AC 261 60% | RD 2% | SPP 0.5% | — |
| 9# | 250 MHR 1.2% + guar 0.3% | AC 261 10% | AC 261 10% | RD 2% | SPP 0.5% | — |
| 10# | guar 1.1% + gelatin 0.4% | AC 261 10% | AC 261 10% | RD 2% | SPP 0.5% | — |
| 11# | guar 1.1% + gelatin 0.4% | AC 261 10% | AC 261 10% | — | — | Borax 4% |
| 12 | A40M 1.0% | — | AC 261 10% | RD 2% | SPP 0.5% | — |

Comparative examples
Colorant was not shown in the table and could be any special kind as described in the specification.

IV. Results a) Colorant Protection

The colorant protection capability of different dispersions of protected first colorant particles was shown in Table 2. To test the protection capability, high shearing speed (>600 rpm) was utilized when mixing the first colorant dispersion and the protective composition of Table 1.

The results showed that Comparative Example 7 cannot protect colorant in high shearing conditions, and colorant particles were released. For Inventive Example 1, 2, 3, 4, and 12, in which methylcellulose (MC) with different molecular weight was utilized as the polysaccharide, colorant particles were all successfully protected. Inventive Example 12 indicated that polymer particles could be an optional component in the first colorant dispersion, and would not significantly influence the protection capability.

Similarly, HPMC based polysaccharide also successfully achieved the protection performance, as shown in Inventive Example 5. Such protection can also be achieved by low concentration MC/HPMC materials. As shown in Inventive Example 6, MC/HPMC content was decreased from 1.5% to 0.2%, and the claimed system well protected the colorant particles.

The structure of the polysaccharide was very critical to achieve the desired protection performance. As shown in Comparative Example 7, another type of cellulose, carboxyl methylcellulose (CMC) was used as the polysaccharide. It showed poor colorant particle protection.

TABLE 2

The protection results by different additives[a]

| No. | Polysaccharide | Colorant Protection[b] |
|---|---|---|
| 1 | MC | Y |
| 2 | MC | Y |
| 3 | MC | Y |
| 4 | MC | Y |
| 5 | HPMC | Y |
| 6 | HPMC/MC | Y |

TABLE 2-continued

The protection results by different additives[a]

| No. | Polysaccharide | Colorant Protection[b] |
|---|---|---|
| 12 | MC | Y |
| 7# | CMC | N | comparative examples;
[a]3% (based on the total weight of the first colorant dispersion) XERACOLOUR ™ red oxide colorant was added in each dispersion of protected colorant particles; ratio of the first colorant dispersion to the protective composition is 1:20;
[b]colorant protection observed by naked eyes; the method was listed in measurement part; Y means colorant was protected, colorant pigments was not released after stirring; N means colorant was not protected, and was released in the water during or after stirring with high shearing force over 600 rpm.

b) Decorative Performance

Figure 2:
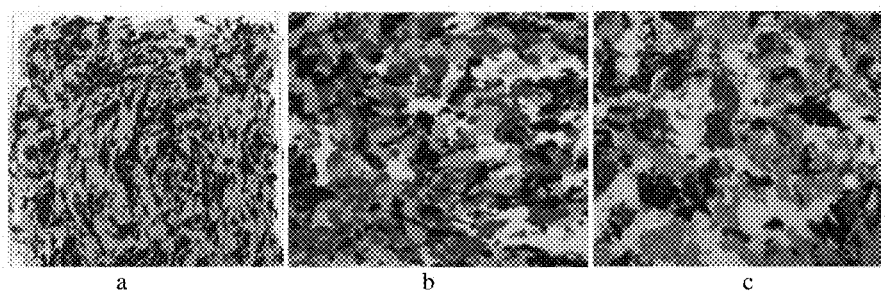
FIG. 2 shows the appearances of Comparative Example 9 (FIG. 2a), Comparative Example 10 (FIG. 2b), and Comparative Example 11 (FIG. 2c).

Dispersions of protected colorant particles were mixed and made of multi-color coating compositions of the present invention. Coating appearances were summarized in Table 3 and FIGS. 1 and 2. Multiple colorants, selected based on different applications, were utilized to simulate real granite appearances. The coating appearance of the present invention (Inventive Example 8, as shown in FIG. 1a) was transparent or semi-transparent with the colorants displayed in band or thread shape, similar to the real marble appearance (FIG. 1b). For Inventive Example 8, coating was sprayed on a white substrate, the white substrate can be observed by naked eye, even in the overlap areas of different colorants. For Comparative Examples 9, 10 and 11 (as shown in FIGS. 2a, 2b, and 2c respectively), they were not transparent or semi-transparent, and the substrates were not observed by naked eye.

TABLE 3

The comparison of coating performance[a]

| No. | Polysaccharide | wt. % colorant, based on the total weight of the first colorant dispersion |
|---|---|---|
| 8 | MC/HPMC | 1% Red, 1% Yellow and 1% Black |
| 9# | HEC | 1% Yellow and 1% Black |
| 10# | guar/gelatin | 1% Red, 1% Yellow and 1% Black |
| 11# | guar/gelatin | 1% Red, 1% Yellow and 1% Black | comparative examples;
[a]ratio of the first colorant dispersion to the protective composition is 1:8.

What is claimed is:

1. A transparent/semi-transparent aqueous color dispersion comprising a first colorant dispersion and a protective composition,
    wherein the first colorant dispersion comprises, based on total weight of the first colorant dispersion,
    from 0.05 wt. % to 10 wt. % of a first colorant;
    from 0.05 wt. % to 10 wt. % of a polysaccharide selected from methylcellulose, hydroxypropylmethylcellulose, and a mixture thereof; and
    water,
    wherein the first colorant dispersion is an aqueous solution; and
    wherein the protective composition comprises, based on the total weight of the protective composition:
    from 10 wt. % to 70 wt. % of polymer particles;
    from 0.05 wt. % to 10 wt. % of a clay; and
    from 0.05 wt. % to 2 wt. % of a peptizing agent;
    wherein the weight to weight ratio of the first colorant dispersion to the protective composition is from 1:30 to 5:1,
    wherein the protective composition comprises an aqueous dispersion of polymer particles, and wherein the transparent/semi-transparent aqueous color dispersion contains substantially no organic solvent.

2. The transparent/semi-transparent color dispersion according to claim 1 wherein the first colorant dispersion further comprises based on total weight of the first colorant dispersion, from 0.5 wt. % to 75 wt. % of polymer particles.

3. The transparent/semi-transparent color dispersion according to claim 1 wherein the first colorant dispersion further comprises a biocide and/or a thickener.

4. The transparent/semi-transparent aqueous color dispersion of claim 1, wherein
    the polymer particles comprise the polymerization product of at least one ethylenically unsaturated nonionic monomer;
    the clay is a hydrous phyllosilicate clay;
    and the peptizing agent is a sodium, lithium, or potassium pyrophosphate, carbonate, polyphosphate, metaphosphate, polyacrylate, or hydroxide peptizing agent, or a combination comprising at least one of the foregoing.

5. The transparent/semi-transparent aqueous color dispersion of claim 4, wherein the ethylenically unsaturated nonionic monomer is a (meth)acrylic ester; a (meth)acrylonitrile; a (meth)acrylamide; an amino-functional monomer; a ureido-functional monomer; an acetoacetate-functional monomer; a styrene; a butadiene; an ethylene, propylene, or α-olefin; a vinyl ester; a vinyl monomer, or a combination comprising at least one of the foregoing.

6. An aqueous color coating comprising the transparent/semi-transparent aqueous color dispersion according to claim 1, wherein the aqueous color coating contains substantially no organic solvent.

* * * * *